US011365602B2

(12) United States Patent
Vracar et al.

(10) Patent No.: US 11,365,602 B2
(45) Date of Patent: Jun. 21, 2022

(54) PROGRAMMABLE PLUG SYSTEM AND METHOD FOR CONTROLLING FORMATION ACCESS IN MULTISTAGE HYDRAULIC FRACTURING OF OIL AND GAS WELLS

(71) Applicants: Jovan Vracar, Calgary (CA); Vladimir Jorgic, Calgary (CA)

(72) Inventors: Jovan Vracar, Calgary (CA); Vladimir Jorgic, Calgary (CA)

( * ) Notice: Subject to any disclaimer, the term of this patent is extended or adjusted under 35 U.S.C. 154(b) by 0 days.

(21) Appl. No.: 16/811,795

(22) Filed: Mar. 6, 2020

(65) Prior Publication Data

US 2020/0308930 A1 Oct. 1, 2020

Related U.S. Application Data

(60) Provisional application No. 62/824,625, filed on Mar. 27, 2019.

(51) Int. Cl.
*E21B 34/14* (2006.01)
*E21B 34/06* (2006.01)
(Continued)

(52) U.S. Cl.
CPC ............ *E21B 34/066* (2013.01); *E21B 33/12* (2013.01); *E21B 43/26* (2013.01); *G05B 19/182* (2013.01); *G05B 19/402* (2013.01); *G05B 19/406* (2013.01)

(58) Field of Classification Search
CPC ......... E21B 34/14; E21B 34/142; E21B 43/26
See application file for complete search history.

(56) References Cited

U.S. PATENT DOCUMENTS 7,150,318 B2 * 12/2006 Freeman ................. E21B 34/14
166/255.1
8,191,623 B2 * 6/2012 Lynde ..................... E21B 37/02
166/98

(Continued)

*Primary Examiner* — Kenneth L Thompson

(57) ABSTRACT

A Programmable plug system for accessing and isolating formations during hydraulic fracturing, consisting of a Programmable Plug and plurality of Sliding Sleeve Valves installed in the casing string of a wellbore, wherein Programmable Plug travels, downwards or upwards through the casing and Sliding Sleeve Valves, wherein during its travel the Programmable Plug detects and counts each sleeve using on-board sensors, electronics and software and wherein the Programmable Plug utilizes detected information to locate, activate and engage itself into the Sliding Sleeve Valves, one at a time, from the top or from the bottom, without locking in, according to programmed sequence (to open, close or bypass) stored in the on-board memory. When engaged to the Sliding Sleeve Valve from the top, the Programmable Plug opens the Sliding Sleeve Valve by applying the pump pressure from the surface, thus providing access to the zone adjacent to the Sliding Sleeve Valve while sealing and isolating the zones below the Sliding Sleeve Valve. Applying pressure in opposite direction, or pulling on by the wire line or slick line winch connected to the Programmable Plug causes the Programmable Plug to disengage itself and travel up the casing string towards next Sliding Sleeve Valve where setting, actuation, and opening is repeated for that Sliding Sleeve Valve. To close open Sliding Sleeve Valve, Programmable plug engages Sliding Sleeve from the bottom side and pushed up by well pressure from the bottom or pulled upwards by the slick line or wire line winch, thus closes the Sliding Sleeve Valve.

12 Claims, 6 Drawing Sheets

(51) Int. Cl.
*E21B 33/12* (2006.01)
*G05B 19/406* (2006.01)
*G05B 19/18* (2006.01)
*G05B 19/402* (2006.01)
*E21B 43/26* (2006.01)

(56) References Cited

U.S. PATENT DOCUMENTS

| | | | |
|---|---|---|---|
| 8,276,674 B2* | 10/2012 | Lopez de Cardenas | ..................... E21B 43/08 166/373 |
| 9,650,851 B2* | 5/2017 | Whitsitt | ................ E21B 47/092 |
| 9,759,040 B2* | 9/2017 | Nguyen | ................. E21B 23/02 |
| 10,392,899 B2* | 8/2019 | Gonzalez | ................ E21B 34/14 |
| 11,002,124 B2* | 5/2021 | Kumar | ................ E21B 33/1295 |
| 2015/0361761 A1* | 12/2015 | Lafferty | ................. E21B 34/14 166/250.01 |
| 2016/0123112 A1* | 5/2016 | Purkis | .................... E21B 34/14 166/320 |
| 2018/0306001 A1* | 10/2018 | Themig | ................... E21B 43/14 |
| 2019/0203575 A1* | 7/2019 | Schlosser | ............... B66D 1/505 |
| 2019/0249520 A1* | 8/2019 | Merron | .................. E21B 43/25 |

\* cited by examiner a)　　　　　　　　b)

PROGRAMMABLE PLUG SYSTEM AND METHOD FOR CONTROLLING FORMATION ACCESS IN MULTISTAGE HYDRAULIC FRACTURING OF OIL AND GAS WELLS

BACKGROUND OF THE INVENTION

In the Oil and Gas industry, multistage fracturing operations have been developed to increase production from low permeability production zones, particularly from shale zones. In multistage fracturing operations the desire is to perform fracturing in designated zones. Wells are drilled and completed prior to hydraulic fracturing and in order for fracturing to occur access to formation needs to be achieved. Currently there are two methods of accessing the well formation for hydraulic fracturing. First one is by using plugs and perforations where well casing is perforated using explosive charges, and perforated zones are sealed and isolated using plugs. With second method, casing string is equipped with a number of valves placed a long pay zones according to pre-determined arrangement, these valves are can be opened or closed to control zone access. Casing string equipped with valves provides more flexibility during fracturing operations and also later during well production. There are a number of valves and plug systems in use today, many of them described in patents:
U.S. Pat. No. 3,054,415-Sleeve valve apparatus
U.S. Pat. No. 4,520,870-Well flow control device
U.S. Pat. No. 4,893,678-Multiple-set downhole tool and method
U.S. Pat. No. 5,263,683-Sliding sleeve valve
U.S. Pat. No. 6,189,619-Sliding sleeve assembly for subsurface flow control
U.S. Pat. No. 6,597,175-Electromagnetic Detector Apparatus U.S. Pat. No. 6,776,239-Tubing Conveyed Fracturing Tool and Method
U.S. Pat. No. 7,363,967-Downhole Tool with Navigation System
U.S. Pat. No. 9,010,447-SLIDING SLEEVE SUB AND METHOD
U.S. Pat. No. 9,752,409-MULTISTAGE FRACTURING SYSTEM WITH Electronic Counting System
US20110278017A1-Sliding sleeve sub and method and apparatus for wellbore fluid treatment
US20120097398A1-Multi-Zone Fracturing System
US20150247375A1-Frac Plug
US20160097269A1-Smart Frac Plug System and Method
US20170234108A1-Frac Plug and Methods of Use

SUMMARY OF INVENTION

Programmable plug system comprises of Programmable Plug and plurality of Sliding Sleeve Valves inserted into the wellbore casing string at specific depths determined by well bore design.

Certain embodiments of the invention herein pertain to a system consisting of a Programmable Plug assembly and plurality of Sliding Sleeve Valve assemblies wherein the Programmable Plug assembly consists of housing, seals, mechanical dogs, sensors, batteries, microprocessor, memory and one or many electric actuators wherein each Sliding Sleeve Valve includes one or many distinct shape features detectable via said Programmable Plug sensors and wherein the microprocessor processes the results of such detection and determines the presence of said Programmable Plug assembly within said Sliding Sleeve Valve and wherein the microprocessor determines the direction of movement of Programmable Plug assembly in reference to said Sliding Sleeve Valve and wherein the microprocessor updates the count of Sliding Sleeve Valve encountered by the Programmable Plug assembly as it travels up or down the casing and wherein the microprocessor relates the Sliding Sleeve Valve number with the pre-programmed number stored in memory and wherein the microprocessor activates the actuator and sets the Programmable Plug assembly once Programmable Plug assembly arrives precisely within the interior of a Sliding Sleeve Valve matching the pre-programmed number and wherein the mechanical coupling is achieved between Programmable Plug and Sliding Sleeve Valve and wherein the pumping pressure from the surface moves the Programmable Plug assembly together with a coupled part of the Sliding Sleeve Valve resulting in opening of the Sliding Sleeve Valve and providing access to the zone adjacent to the Sliding Sleeve Valve while simultaneously providing a seal and isolating the section of the well bore section below said Sliding Sleeve Valve.

In certain other embodiments of the invention, surface mounted slick line or wire line winch is connected with solid steel cable to the rear end of Programmable Plug assembly wherein the winch is allowed to unwind as Programmable Plug assembly travels down the casing and wherein the winch is actuated at the surface to pull the Programmable Plug assembly in order to transport the Programmable Plug assembly to the next Sliding Sleeve Valve or to pull the Programmable Plug assembly completely out of the casing.

In certain other embodiments of the invention the memory is preprogrammed with a number of a target Sliding Sleeve Plug that needs to be closed, wherein the Programmable Plug assembly is suspended on a surface mounted winch with solid steel cable wherein the Programmable Plug assembly counts Sliding Sleeve valves as it travels down the casing and wherein the Programmable Plug activates and engages the target Sliding Sleeve Plug allowing the closing of said Sliding Sleeve valve by pulling on the steel cable attached to Programmable Plug assembly.

In certain other embodiments of the invention plurality of proximity switches are installed into the sensor head of Programmable plug assembly wherein proximity switches are arranged in a radial configuration perpendicular to the longitudinal axis and wherein the Sliding Sleeve Valve is designed with a section of smaller diameter such that all proximity switches are activated upon passage of Programmable Plug assembly through said section of smaller diameter of the Sliding Sleeve Valve.

In certain other embodiments of the invention plurality of mechanical spring loaded pins are installed into the sensor head wherein said pins are allowed to retract upon mechanical contact with the smaller radius section of the Sliding Sleeve Valve wherein this simultaneous retraction of said pins is detected using one or many optical, ultrasonic or force sensors installed in the interior of the sensor head.

BRIEF DESCRIPTION OF DRAWINGS

FIG. 1a shows the Sliding Sleeve Valve in closed position.
FIG. 1b shows the Sliding Sleeve Valve in open position
FIG. 2a shows Programmable Plug assembly with mechanical dogs retracted
FIG. 2b shows Programmable Plug assembly with mechanical dogs extended
FIG. 4a shows Sliding Sleeve Valve in closed position
FIG. 4b shows Sliding Sleeve Valve in open position
FIG. 5a shows coils wound on the outer surface in longitudinal direction configuration
FIG. 5b shows detection coils arranged in radial direction configuration
FIG. 5c shows sensor head with mechanical pins

DESCRIPTION OF THE INVENTION

Figure 1:
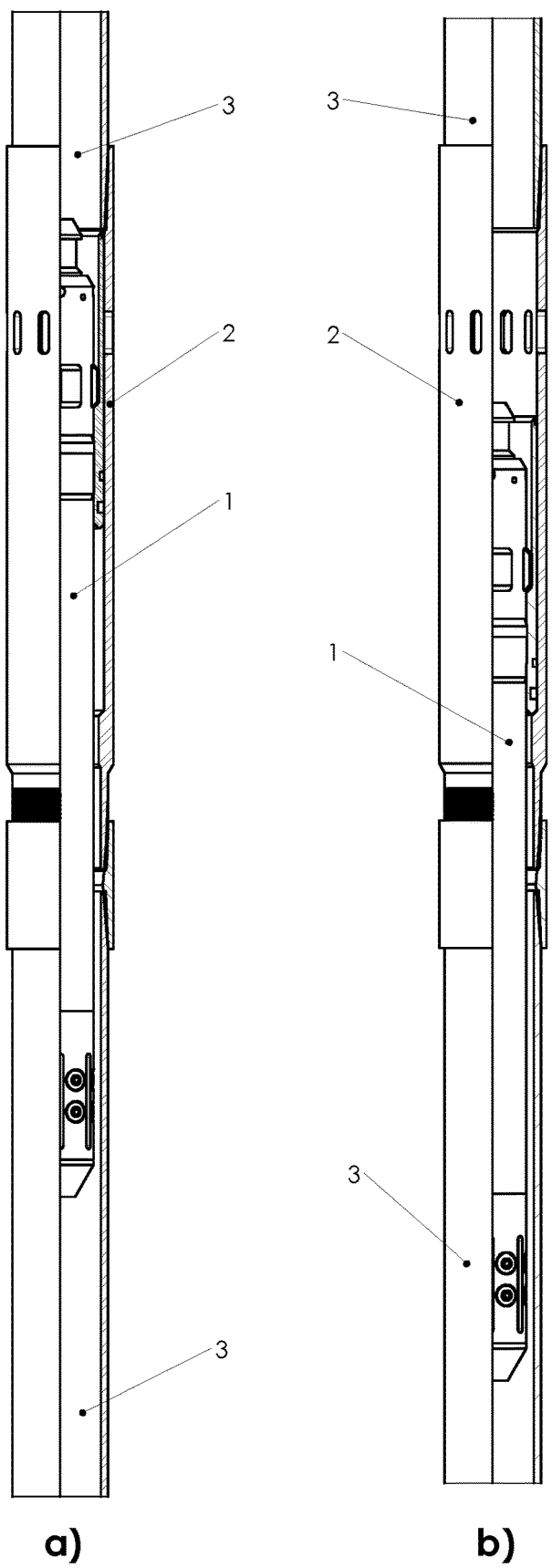
FIG. 1 is a section view a Sliding Sleeve Valve in the casing string and Programmable Plug activated in the Sliding Sleeve Valve.
Figure 2:
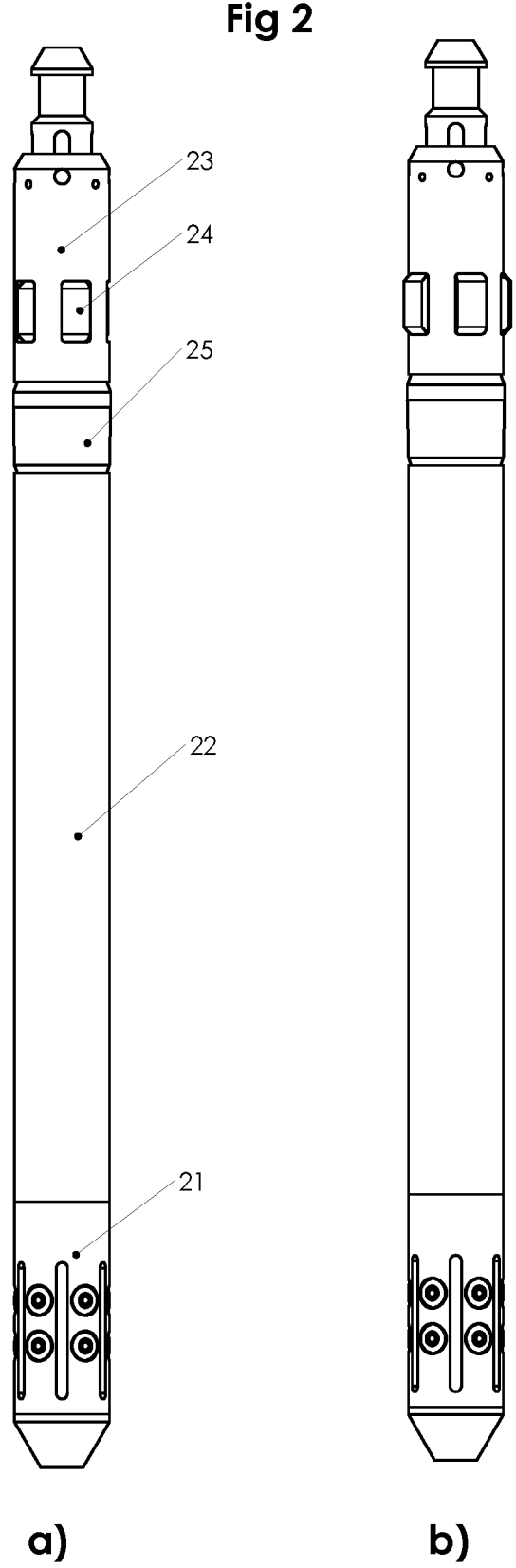
FIG. 2 is a view of Programmable Plug assembly
Figure 4:
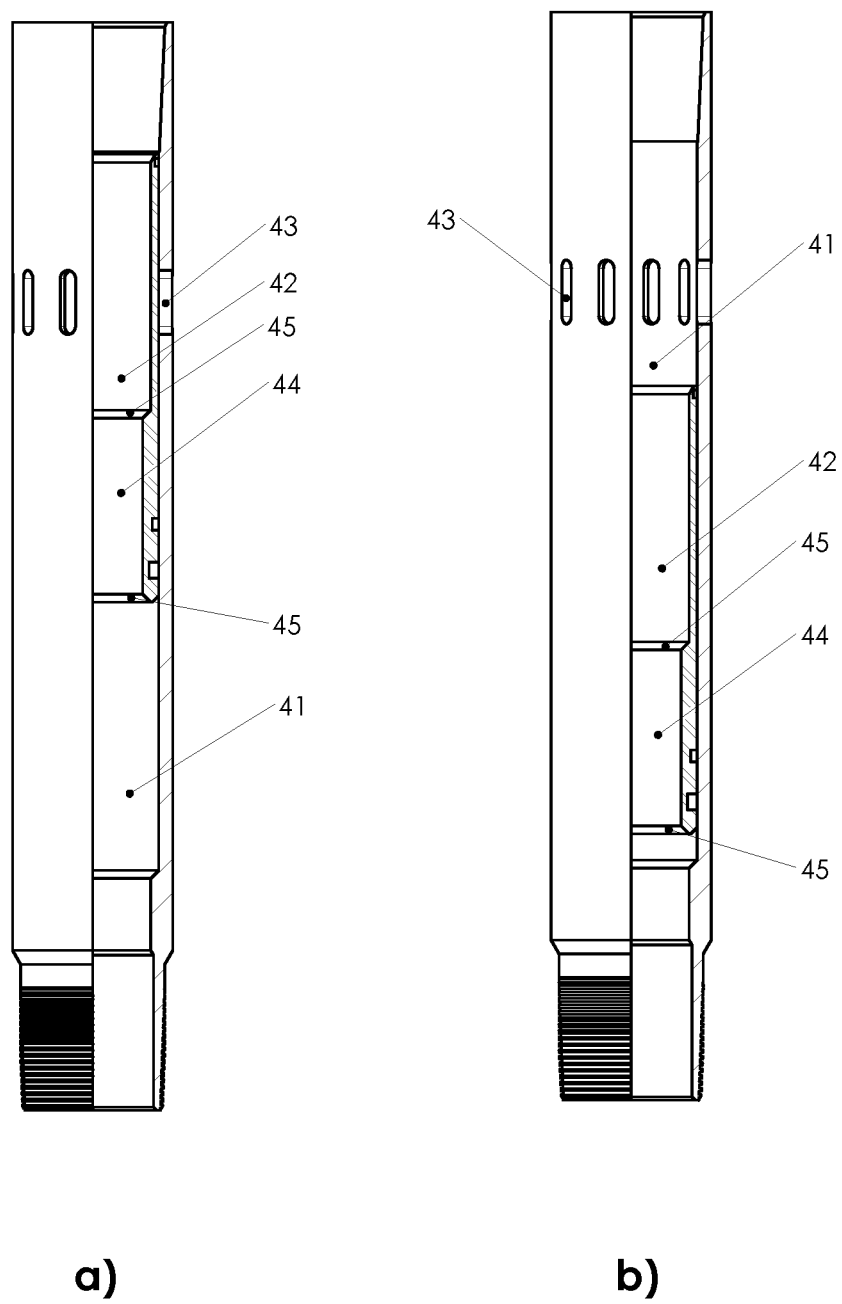
FIG. 4 is a section view of Sliding Sleeve valve
Figure 5:
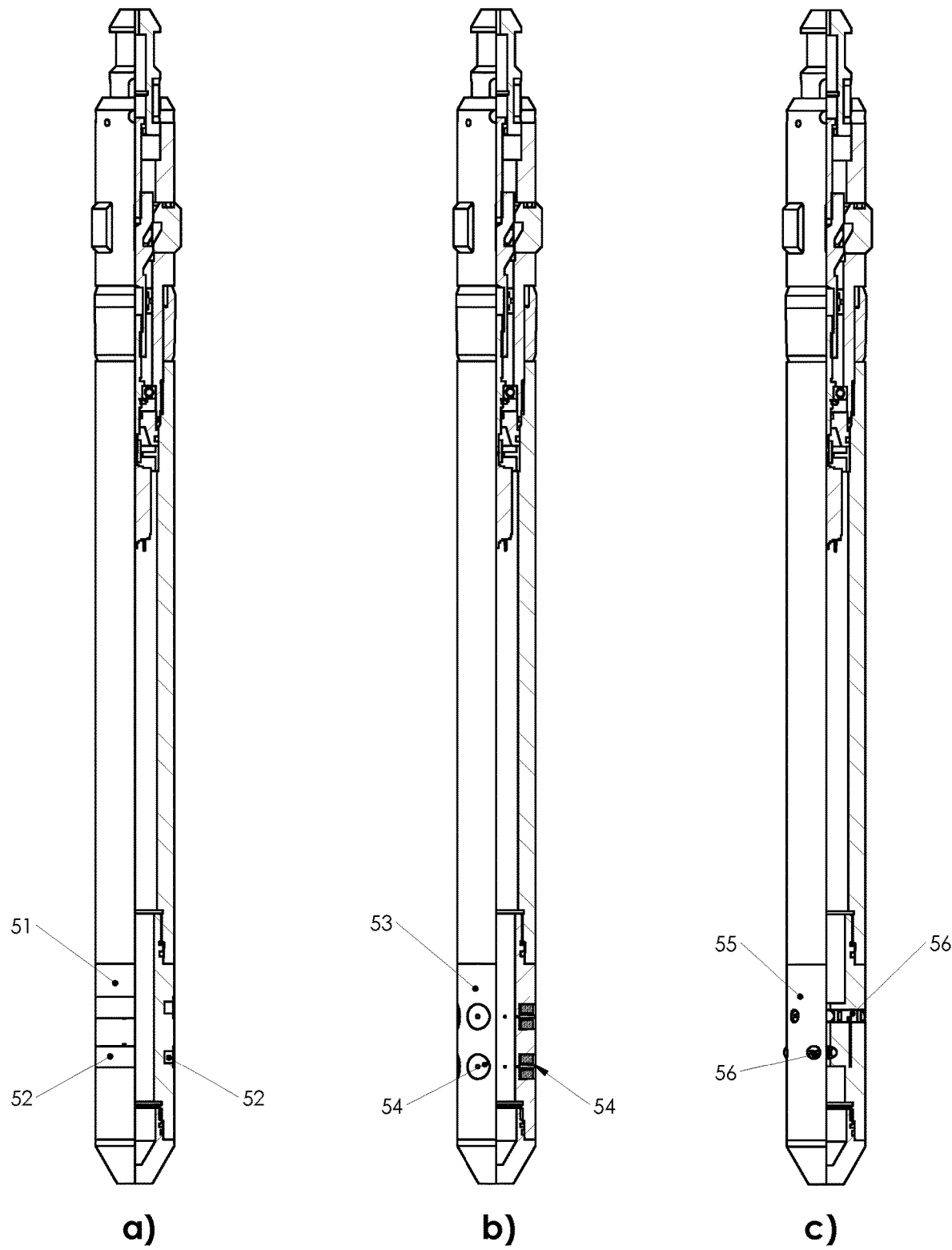
FIG. 5 is a section view of Programmable Plug assembly showing different configurations of sensors

The Programmable Plug System comprises the Programmable Plug assembly (FIG. 1, Item 1) and one or more Sliding Sleeve Valves (FIG. 1, Item 2) inserted into the casing string (FIG. 1, Item 3). The Programmable Plug consists of three tubular sections integrated into one assembly. First tubular section (FIG. 2, Item 21) contains two sets of proximity switches (FIG. 3, Item 37) positioned apart in the tubular axial direction. Each set of proximity switches contains plurality of proximity switches arranged in radial direction around tubular axis. Sensitivity of said proximity switches is adjusted such that they can only be activated at a known predefined distance. Some proximity switches are allowed to activate while Programmable Plug moves through the casing, however passing through the distinct small diameter (FIG. 4, Item 44) of the Sliding Sleeve Valve, all the switches are activated and the Programmable Plug detects the travel through the Sliding Sleeve Valve. Movement direction is determined from the order of activation of said sets of proximity switches. Outputs of said proximity switches are connected to the on-board microprocessor where on-board software records the direction and calculates the number of Sliding Sleeve Valve that is being traversed. Microprocessor compares said Sliding Sleeve Valve number with the current sequence number preprogrammed in the memory and it activates the electro-mechanical dogs (FIG. 2, Item 24) that engage the Programmable Plug assembly into the Sliding Sleeve Valve. In another embodiment of the invention, Sensor Section (FIG. 5a, Item 51) contains two coils (FIG. 5a, Item 52) wound in circular groves on the outer surface of the first tubular section positioned apart in the longitudinal axis direction. Said coils detect internal diameter of the Sliding Sleeve Valve determining plug movement direction, number of Sliding Sleeve Valves passed and activate electro-mechanical dogs to set the plug into the Sliding Sleeve Valve. Another embodiment of the Sensors Section (FIG. 5b, Item 53) comprises two or more sets of coils (FIG. 5b, Item 54) positioned apart in the axial direction. Each set of coils consists of plurality of individual coils with coil axis arranged in radial direction around longitudinal tubular body axis. One of the side surfaces of the coils is flush with tubular body outer surface. In certain other embodiments of the invention plurality of mechanical spring loaded pins (FIG. 5c, Item 56) are installed into the sensor head (FIG. 5c, Item 55) wherein said pins are allowed to retract upon mechanical contact with the smaller diameter section of the Sliding Sleeve Valve where in this retraction of said pins is detected using one or many optical, ultrasonic or force sensors installed in the interior of the sensor head.

Figure 3:
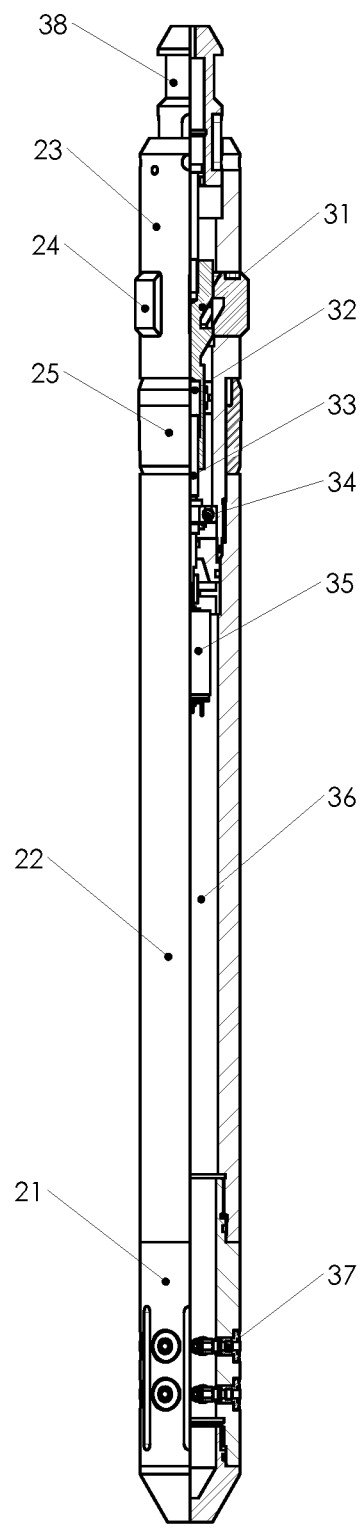
FIG. 3 is a section view of a Programmable Plug assembly

Second tubular section (electro-mechanical section) (FIG. 2, Item 22) contains microprocessor, memory, batteries (FIG. 3, Item 36), battery powered actuator (FIG. 3, Item 35), screw shaft (FIG. 3, Item 33), axially moving shaft with internal thread (FIG. 3, Item 32) coupled to thread on said screw shaft. Screw shaft is constrained by bearing (FIG. 3, Item 34) inside the second tubular section. It is connected to and driven by battery powered actuator (FIG. 3, Item 35). Axially moving shaft is driven by screw shaft in axial direction both ways.

Third tubular section (Dogs and Seal Section) (FIG. 2, Item 23), contains dogs (FIG. 2, Item 24) that engage the particular Sliding Sleeve Valve that has to open or close, and seal (packer) (FIG. 2, Item 25) that insulates spaces above and below the plug allowing the fracturing flow to penetrate the zone through the openings on the Sliding Sleeve Valve. Dogs are activated by wedges on the axial moving shaft (FIG. 3, Item 31).

One or plurality of Sliding Sleeve Valves is installed in the casing string at specific depths determined by wellbore design. Sliding Sleeve Valve consists of outer tubular body (Sliding Sleeve Valve Body) (FIG. 4, Item 41) with holes or slots circularly arranged around longitudinal axis of tubular body (FIG. 4, Item 43), and inner tubular body (Sliding Sleeve) (FIG. 4, Item 42) with seals between outer tubular body and inner tubular body insulating holes or slots from pressure inside of the casing string. Sliding Sleeve has section (FIG. 4, Item 44) with the internal diameter smaller than the casing internal diameter, allowing the Programmable Plug Sensors to detect it, count the Sliding Sleeve Valve and, with the dogs activated, engage itself into the Sliding Sleeve from the top or from the bottom, depending on sequence (to close, open or bypass) assigned to the Sliding Sleeve Valve. The Sliding Sleeve section with the smaller inner diameter (FIG. 4, Item 44) provides sealing surface against the Programmable Plug and with the conical surfaces on the section both ends (FIG. 4, Item 45) provides the Programmable Plug engagement from the top or from the bottom.

Figure 6:
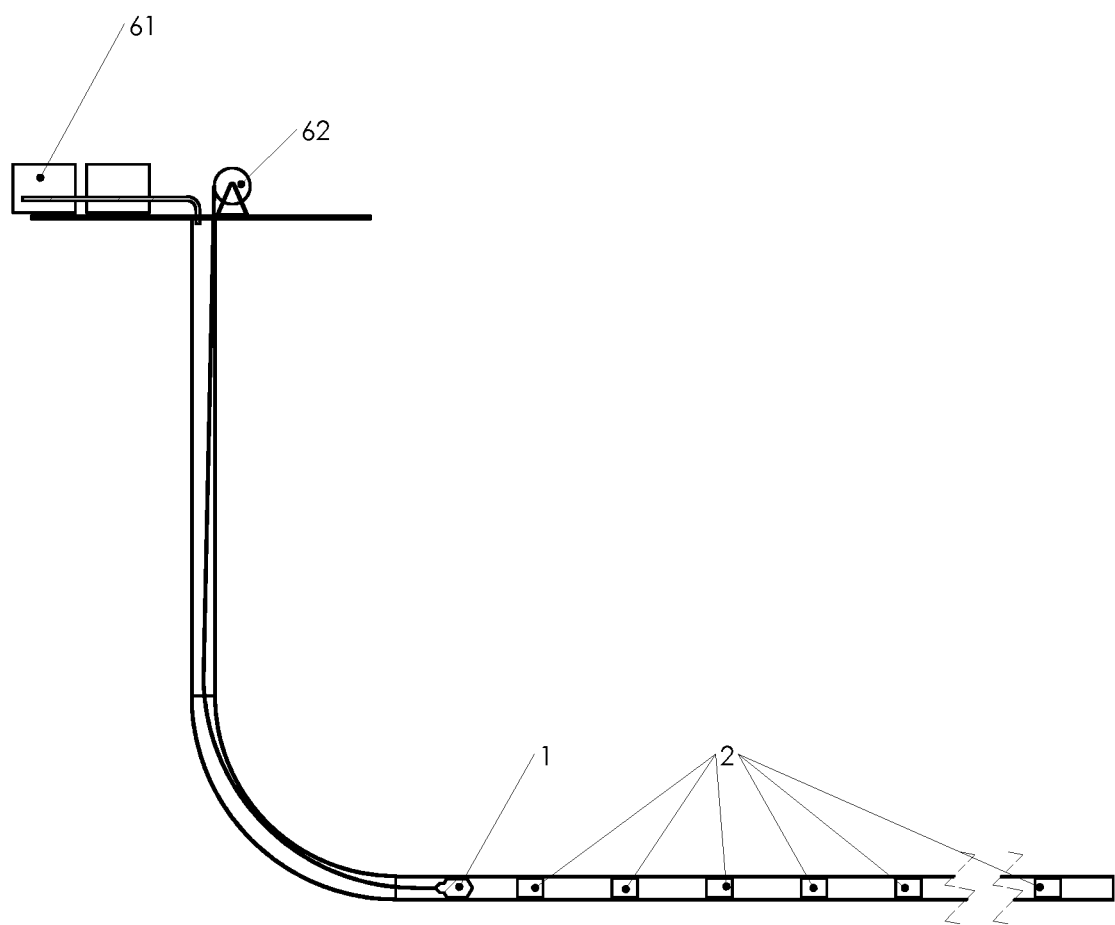
FIG. 6 is a schematic view of an oil and gas well with the Sliding Sleeve Valves, Programmable Plug, slick line/wire winch and pumps.

Programmable Plug may be used as standalone unit wherein it is pumped down hole with the pumps on the surface (FIG. 6, Item 61) and moved up hole by well pressure. Optionally, Programmable Plug may be used with wire line or slick line winch (FIG. 6, Item 62) for convenience and enhanced operations. Standard wire line/slick line connection is part of the Programmable Plug (FIG. 3, Item 38). The winch is an instrumented winch having a rotary encoder and tension sensor.

Base of the invention is Programmable Plug which autonomously detects and counts Sliding Sleeve Valves incorporated in the casing string in the gas and oil wells intended for the hydraulic fracturing, engages with the Sliding Sleeve Valves, one at a time, as it was preprogrammed and performs sequence, said to open, close or bypass, assigned to the Sliding Sleeve Valve. Multiple sequences on number of Sliding Sleeve Valves may be performed in short time, with increased efficiency and high accuracy and with not using expensive equipment as coil tubing units. The Programmable Plug System is convenient for intervention on the wells during the time of the well production, when formation access may be controlled by opening and closing the Sliding Sleeve Valves, or for performing future hydraulic fracturing jobs.

We claim:

1. A programmable plug system for controlling formation access in multi stage hydraulic fracturing of oil and gas wells by preprogramming a programmable plug for a particular well to count and to engage, without locking in, autonomously one or more sliding sleeve valves, one at a time, installed in a casing string of that well, in a preprogrammed order, and to allow sequences, to open, close or bypass, assigned to the sliding sleeve valves being performed, comprising: a programmable plug featuring a microprocessor or microcontroller and sensors; the one or more sliding sleeve valves featuring a section with a specific internal diameter detectable by programmable plug sensors and designed to provide the programmable plug engagement to the Sliding Sleeve Valve from the top or from the bottom, without locking in the sliding sleeve valve and providing a sealing surface for the programmable plug; and including an instrumented slick line or wire line winch with a timer synchronized with the programmable plug microprocessor or microcontroller.

2. The programmable plug system of claim 1 wherein the programmable plug is preprogrammed for the particular oil and gas well, before it is disposed into well, to count and to engage autonomously the sliding sleeve valves, one at a time, in the preprogrammed order and according to sequences assigned to the sliding sleeve valves, to open, close or bypass a particular sliding sleeve valves, comprising: a sensors section; an electro-mechanical section; dogs and a seal section.

3. The programmable plug system of claim 2, wherein the sensor section comprises: a tubular body; at least one battery powered sensor capable of detecting the sliding sleeve valve specific internal diameter; at least one battery powered sensor capable of detecting the direction of movement of the programmable plug.

4. The programmable plug system of claim 2, wherein the sensor section comprises: a tubular body; one, two or more sets of proximity switches positioned apart in the axial direction wherein each set comprises of plurality of proximity switches arranged in radial direction around the longitudinal axis of the tubular body with a sensing face flush with the outer surface of the tubular body activated when traversing the sliding sleeve valves.

5. The programmable plug system of claim 2, wherein the sensor section comprises: a tubular body; one, two or more sets of coils positioned apart in the axial direction wherein each coil is wound into a circular groove on the outer surface of the tubular body wherein the outer cylindrical surface of the coil is flush with the tubular body outer surface, and wherein said coils detect the sliding sleeve valves being traversed.

6. The programmable plug system of claim 2, wherein the sensor section comprises: a tubular body one, two or more sets of coils positioned apart in the axial direction wherein each set of coils consists of a plurality of individual coils with a coil axis arranged in a radial direction around the longitudinal axis wherein one of the side surfaces of the coils is flush with outer surface of the tubular body wherein said coils detect the sliding sleeve valves being traversed.

7. The programmable plug system of claim 2, wherein the sensor section comprises: a tubular body; one or more sets of spring loaded pins wherein said pins are allowed to retract upon mechanical contact with the Sliding Sleeve Valve wherein this retraction of said pins is detected using one or many optical, ultrasonic, proximity or force sensors installed in a sensors head.

8. The programmable plug system of claim 2, wherein the electro-mechanical section comprises; a tubular body with a sealed inner cavity; a battery operated microprocessor or microcontroller connected to one or many sensors programmed to read sensors and record the presence of sliding sleeve valves, record the current number of the Sliding Sleeve Valves being traversed and comparing it against the preprogrammed numbers and sequences, to open, close or bypass, assigned to the sliding sleeve valves and, when numbers are matched, actuating a battery powered electric actuator to engage the dogs to the sliding sleeve valves and record the time of the events; a battery powered memory storing preprogrammed numbers and sequences, to open, close or bypass, the sliding sleeve valves; including batteries; and the battery powered electric actuator.

9. The programmable plug system of claim 2, wherein the dogs and the seal section comprises: a tubular body; the dogs to engage the sliding sleeve valves; a seal to seal against sliding sleeve valves and insulate pressure below the programmable plug from a larger pressure above it; an axially moving shaft coupled with an electric actuator to activate and deactivate the dogs; including a wire-line or slick-line connection.

10. The programmable plug system of claim 1, wherein the sliding sleeve valve comprises: an outer tubular body with threaded ends to connect in the casing string; circularly arranged holes placed around the outer tubular body providing fluid communication between inside and outside of the outer tubular body; an inner tubular body which fits into the outer tubular body and closes or opens holes in the outer tubular body by moving axially; the inner tubular body comprises a specific inner diameter section with conical surfaces on both ends of the section allowing the programmable plug to detect and count the sliding sleeves valves, and to engage to the sliding sleeve from the top or from the bottom, without locking in it, depending on the programmed sequence and seal it.

11. The programmable plug system of claim 1, wherein instrumented slick line or wire line winch compromises: a coil of steel wire terminated with a connector to connect to the programmable plug; an actuator for turning the coil and pulling the programmable plug upwards or allowing the programmable plug to move downwards by turning the coil in opposite directions; an electronic encoder for measuring slick line/wire line movement; a slick line/wire line tensionmeter; a timer synchronized with time recorded by the microprocessor and microcontroller in the Programmable Plug.

12. A method for controlling formation access in a multistage hydraulic fracturing of an oil and gas well by a programmable plug system, the method comprising steps of: installing one or more sliding sleeve valves in a casing string at designated depths; preprogramming a number and sequence, to close, open or bypass, for each sliding sleeve valve installed in the well into a memory of the programmable plug wherein the sliding sleeve valve number corresponds to its position in the casing counted from the top of the well wherein the sliding sleeve valve at the smallest depth is marked as the first and wherein its number is designated as one; disposing the programmable plug into the casing of a wellbore; pumping fluids into the casing causing the programmable plug to travel inside the casing towards the bottom of the well; monitoring sensor signals and detecting the programmable plug traversing the sliding sleeve valves and detecting the traverse direction; increasing the current sliding sleeve valve number each time the programmable plug detects that the sliding sleeve valve is traversed in downward direction; comparing the current sliding sleeve valve number with the number and sequence stored in the memory; activating dogs and engaging the programmable plug to the sliding sleeve valve from the top, without locking in, when the current sliding sleeve valve number is equal to the number and sequence stored in the memory; confirming the programmable plug was engaged and set and the sliding sleeve valve was open by correlating pressure reading from the pumps; moving the programmable plug up from the Sliding Sleeve valve the dogs are deactivated and the programmable plug ready for the next sequence upwards or downwards depending on programmed sequences, to close, open or bypass next valve; selecting the next number and sequence stored in the memory; moving the programmable plug upwards in the casing; decreasing the current sliding sleeve valve number each time the programmable plug detects the passage through the sliding sleeve valve in upward direction; activating the dogs and engaging the programmable plug into the sliding sleeve valve when the current sliding sleeve valve number is equal to the number and sequence stored in the memory; if sequence is to close the sliding sleeve valve, programmable plug engages the sliding sleeve valve from the bottom, without locking in; confirming the engagement of the programmable plug and sliding sleeve valve, and that sliding sleeve valve is open by using a winch rotary encoder and a tension sensor; pulling the programmable plug out of the well with a wire line or slick line winch when the all programmed sequences are accomplished.

\* \* \* \* \*